United States Patent [19]
Szpur et al.

[11] 3,996,947
[45] Dec. 14, 1976

[54] MAKE-UP KIT

[75] Inventors: Roman Szpur; James M. Holahan, both of Dayton, Ohio

[73] Assignee: Fashion Optics, Inc., Dayton, Ohio

[22] Filed: Nov. 10, 1975

[21] Appl. No.: 630,523

[52] U.S. Cl. .............................................. 132/79 G
[51] Int. Cl.$^2$ ........................................ A45D 40/00
[58] Field of Search ............... 132/79, 83; 312/280; 350/202

[56] References Cited
UNITED STATES PATENTS

| | | | |
|---|---|---|---|
| 2,136,843 | 11/1938 | Dinkel | 312/280 |
| 3,527,524 | 9/1970 | Pace et al. | 350/202 |
| 3,632,191 | 1/1972 | Cox | 350/202 |

*Primary Examiner*—G.E. McNeill
*Attorney, Agent, or Firm*—Biebel, French & Nauman

[57] ABSTRACT

A make-up assist kit particularly suitable for applying eye make-up or the like incorporates a lid pivotally secured to a base along one edge of the base and a lens supporting frame or yoke carrying a pair of prescription lenses. The yoke is pivotally attached along an opposite edge of the base and the lenses thereon are movable between a folded position into the interior of the case and an erected self-holding position. The lid and base provide support members which support the kit at an inclined position, and the lid incorporates a mirror through which an eyeglass wearer can comfortably observe herself in applying eye make-up or the like by viewing through the prescription lenses. The lid also incorporates a pair of suction cups on the inside surface thereof and the lid may be folded back to an opposite right-angled position with respect to the base and applied to a vanity mirror or the like. In this position the lenses are supported in spaced relation to the vanity mirror, and the base is supported on the lid, which in turn, is supported on the surface of the mirror.

9 Claims, 10 Drawing Figures

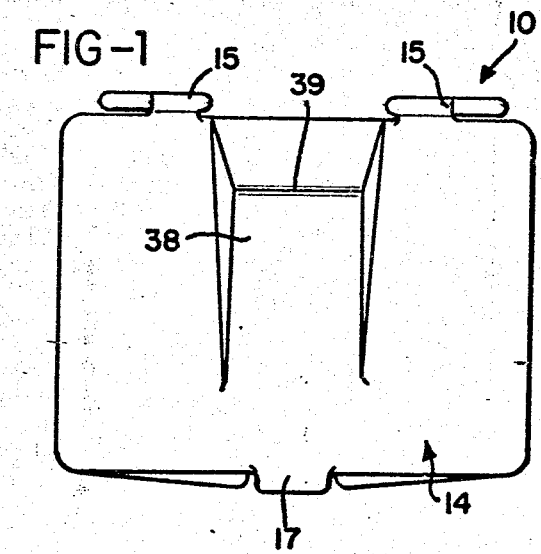
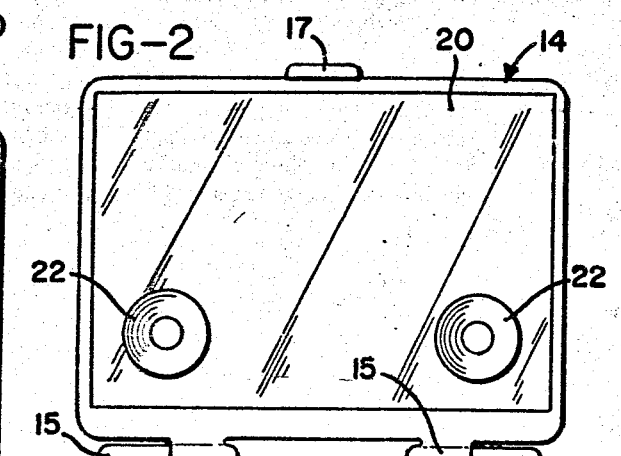
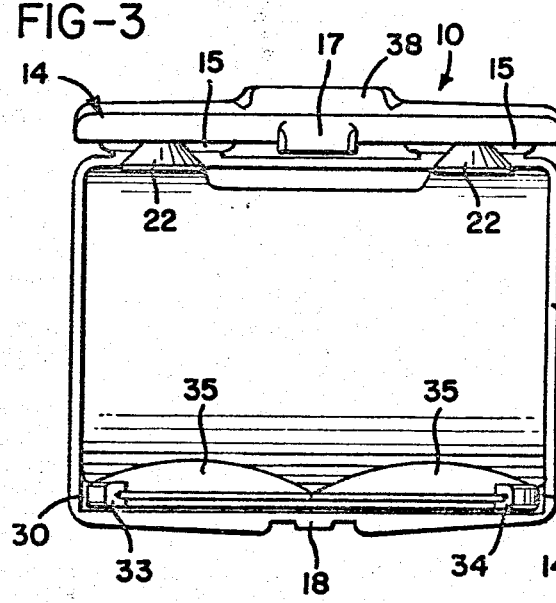
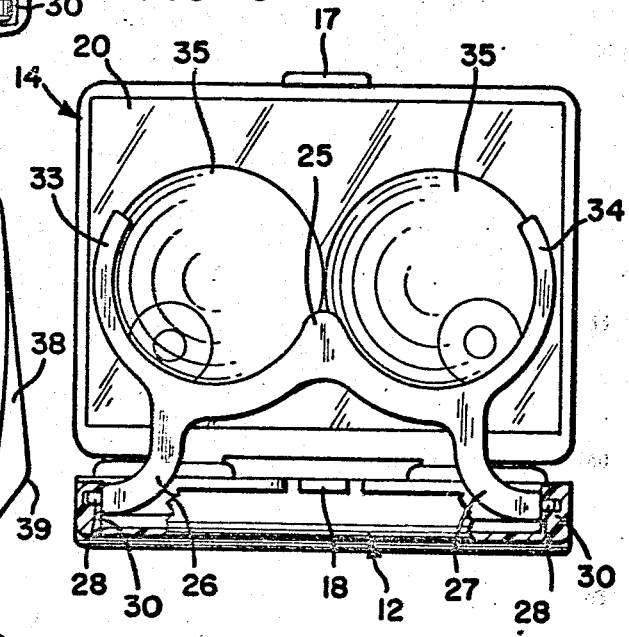
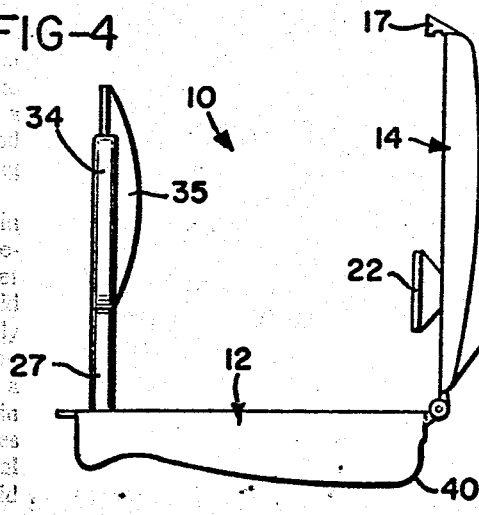

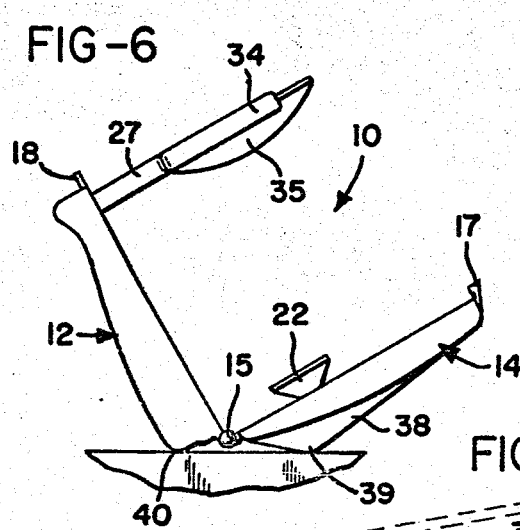
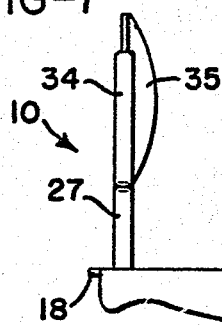
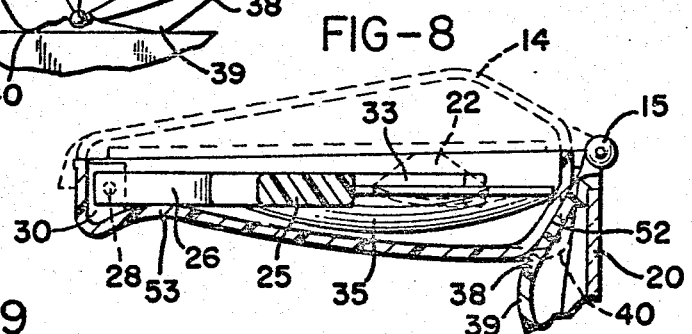
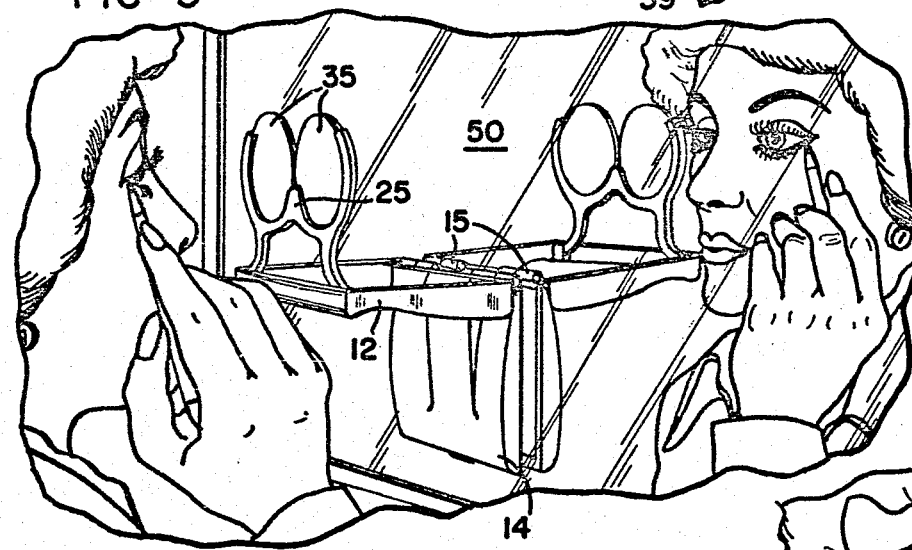
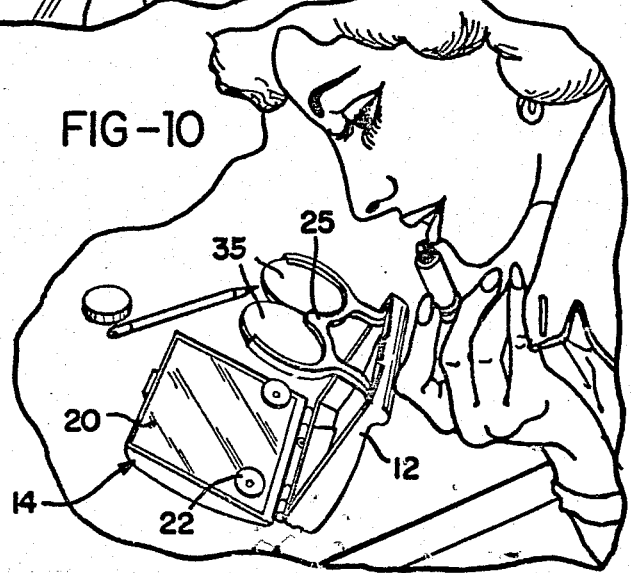

MAKE-UP KIT

BACKGROUND OF THE INVENTION

The present invention is directed to a cosmetic kit and more particularly to a versatile eye make-up compact which employs prescription type lenses and which may be used in a variety of positions or hand held for assisting in applying eye make-up.

The prior art contains a number of devices which have been employed for the purpose of facilitating the application of make-up and the like in combination with a mirror. However, such devices have not come into general public acceptance or use because they were generally deficient in one or more important respects. First, such devices commonly provided merely simple magnifying lenses and thus did not provide any correction for the user's own need for corrective lenses. Therefore, a person who is farsighted would normally have more difficulty in applying eye make-up for example, than a person who is normally sighted or nearsighted. Also, the need for an astigmatic and also presbyoptia correction may provide corresponding difficulties in applying make-up.

In addition, prior devices have commonly been usable only in a single mode in that they did not provide any means by which the devices could be applied to and used in connection with a large bathroom or vanity mirror. Further, such prior devices, when designed into a compact form, could only be placed on a table or desk surface in one position, when in use and did not provide for placement thereof in multiple positions or to an inclined position.

SUMMARY OF THE INVENTION

The present invention is directed to a cosmetic assist kit which provides for the use of lenses which are made according to the wearer's own prescription. In addition, the kit is arranged in compact form with a hinged top and base member and a hinged prescription eye piece supporting frame foldable therein. When the compact is open, it may be hand held, or supported on a flat surface in a stable tilted position. Also, the cover may be folded back into right-angle relation to the base and attached to a vanity mirror by means of integral suction cups so that the prescription lenses are thereby supported in a proper spatial relation to such vanity mirror.

It is accordingly an object of this invention to provide a make-up assist kit which employs prescription lenses to complement exactly the correction needs of the user, so that the user may comfortably use the kit with the eyeglasses or contact lenses removed.

Another important object of this invention is the provision of an eye make-up kit in compact form which is provided with an integral mirror and which is also usable with an auxiliary mirror such as a vanity or bathroom mirror.

Another object of this invention is the provision of an eye make-up kit having an integral mirror and which kit is supported on a flat supporting surface or hand held to provide a choice of positions for the user.

A further object of the invention is the provision of an eye make-up kit in which a cover or lid is pivotally attached to a base along one edge and in which a lens support frame is pivotally attached to the base adjacent the opposite edge, with the lens support frame being foldable into the interior of the base and being movable from the folded position to an erected position in which the frame supports a pair of corrective lenses in essentially vertical relation to the base and in spaced relation to the cover mirror.

Another object of the invention is the provision of a kit as defined in the preceding object in which the cover may be pivoted to a folded-back position and incorporates thereon means by which the kit may be secured to the surface of a vanity mirror or the like while maintaining the lenses in essentially the proper spatial relation from the accessory mirror.

These and other objects and advantages of the invention will be apparent from the following description, the accompanying drawings and the appended claims.

BRIEF DESCRIPTION OF DRAWINGS

FIG. 1 is a plan view of a kit in accordance with this invention;

FIG. 2 is a plan view showing the lid in the open position and showing the lenses and lens support yoke folded into the interior of the base;

FIG. 3 is a plan view showing the lid and the lenses in upright right-angled relation to the base;

FIG. 4 is a side elevation of the opened kit of FIG. 3;

FIG. 5 is a front elevation thereof;

FIG. 6 illustrates the manner in which the opened kit may be placed at an inclined stable position;

FIG. 7 shows the manner in which the kit is self-holding on a vanity mirror;

FIG. 8 is a longitudinal section through the base and a fragment of the cover shown in the fully open and folded back position and also shown in broken line form in the closed position;

FIG. 9 illustrates the manner in which the kit of the present invention is used in the mirror attaching mode of FIG. 7; and FIG. 10 illustrates the manner in which the kit is used in the inclined mode of FIG. 6.

DESCRIPTION OF THE PREFERRED EMBODIMENTS

Referring to the drawings, a self-contained cosmetic or eye make-up kit constructed according to this invention is illustrated at 10 as including a base 12 and a hinged lid or cover 14. The cover and base are hinged along one edge of the base as illustrated by the integral hinges 15 of FIGS. 1 and 2.

The parts of this invention including the base and the cover may be made of impact-resistant plastic material and when the parts are folded together as illustrated in FIG. 1, the package may easily be carried in a lady's handbag. The cover and base interlock with each other in the closed position by means of a tongue 17 on the cover 14 which latches with a tab 18 on the base, on the side opposite the hinges 15. The inside of the cover supports a flat mirror 20. A pair of small soft suction cups 22 are also supported on the mirror adjacent the hinged side of the cover 14.

Means in the base for supporting a pair of lenses includes a lens yoke or cradle 25 which is formed with a pair of depending legs 26 and 27 terminating in transversely extending hinge pins 28. The cradle 25, including the legs 26 and 27, is initially formed so that the legs tend to spring out a distance slightly greater than the spaced-apart distance of hinge receiving bosses 30 formed on the inside of the base 12. Therefore, the cradle is placed into position by urging the legs slightly together and permitting the hinge pins 28 to snap into the bosses 30, so that the cradle is pivotally about the hinge pins 28, and is essentially self-holding in an elevated position.

The cradle includes left and right-hand semi-circular yoke portions 33 and 34 which are configured to receive and support a pair of prescription lenses 35 along their peripheral edges. The prescription lenses 35 may be formed from circular blanks which are, after grinding, suitably inserted into the respective yoke portions 33 or 34, and cemented in place.

One of the important advantages of the present invention is the provision of an eye make-up kit in which prescription type lenses may be used to eliminate the distortion which is often caused to an eyeglass wearer when attempting to use customary make-up devices employing simple magnifying lenses. To this end, blanks making up the lenses 35 are prepared from the user's prescription, except that the power is adjusted by reason of the change from the usual vertex distance of 14 millimeters to that of approximately 128 millimeters, that is, the distance between the lenses 35 and the mirror 20, when the cover 14 and the lens supporting cradle 25 are in the erected position, as shown in FIG. 4. Further, the power of the lenses is corrected to provide optimum focus for a working distance of about 9 inches from the user to the surface of the mirror 20.

One of the important advantages of the present invention is that of its versatility. It may be hand held in the position shown in FIG. 4. However, the cover is provided with a central raised rib portion 38 as best shown in FIG. 6. The lower heel portion 39 of the rib 38 provides a support together with the adjacent rounded edge 40 of the base 12, to provide a stable inclined or tilted support for the kit 10 when the cover 14 is opened up at essentially right angles to the base 12. In this position the mirror is inclined upwardly at an angle about 30° from the vertical and is thus uniquely convenient for a user sitting at a vanity table to apply eye make-up or lipstick by looking down into the mirror 20 through the lenses 35 in the manner illustrated in FIG. 10.

A second particular feature of this invention resides in the fact that provision is made for supporting the lenses 35 in proper spatial relation to an existing mirror surface, such as to a vanity mirror 50, as shown in FIG. 7. For this purpose the cover 14 is rotated or folded back on the hinges 15 to a position approximately 180° from that which it occupies in FIG. 4. This position is fixed and defined by a center flat inclined surface 52 on the base coming into registration and contact with the rib portion 38 of the cover 14, as illustrated in enlarged detail in FIG. 8. The suction cups 22 may then be applied to the surface of the mirror 50 and when they are compressed, the tongue 17 comes into contact with the mirror. The cover 14 is now held in stable parallel relation on the mirror, supported by the suction cups 22 and by the engagement of the tongue 17 on the mirror surface. Now, the kit may be used in the manner illustrated in FIG. 9, providing versatility in that the user may employ her own mirror in the use of the kit.

It will therefore be seen that this invention provides a compact kit which is versatile in use. In the closed position, the suction cups 22 bear gently against the adjacent surface of the lenses 35, thus retaining them within the interior of the base 12, and eliminating rattling and vibration. The yoke 25 rests against a raised portion 53 of the base and prevents the lenses from coming into contact with the case, when they are lowered, as shown in FIG. 8. When the cover is opened to the vertical position as shown in FIG. 4, it is self-holding in this position by friction of the hinges 15. Then, the lens yoke may be raised to its vertical position with respect to the base 12, and it too is self-holding. At this position the lenses are optically aligned with the cover mirror 20 and the kit 10 may be hand held. If desired, the kit may be placed on the surface of a table in an inclined position in which it is stable, as shown in FIGS. 6 and 10, permitting the user the freedom of using both hands. However, a user may find it more convenient to apply the kit to a mirror 50 as shown in FIGS. 7 and 9. When the user has completed, it is preferred to remove the kit from the mirror 50 to prevent it from falling in case the suction cups 22 should lose their grip over a period of time.

While the form of apparatus herein described constitutes a preferred embodiment of this invention, it is to be understood that the invention is not limited to this precise form of apparatus, and that changes may be made therein without departing from the scope of the invention.

What is claimed is:

1. An appliance useful to wearers of corrective eyeglasses for applying make-up to the eyes, with the glasses removed comprising:
    a case having a top and bottom section,
    at least one prescription lens,
    a mirror surface on the interior of said top section,
    means supporting said lens in alternate position with respect to said bottom section,
    said supporting means in one position with the case open holding said lens upright from said bottom section and in spaced relation to said mirror surface, defining a vertex distance with said mirror which substantially exceeds that of prescription eyeglasses,
    said supporting means in another position with the case closed holding said lens stored generally parallel to said bottom section.

2. An appliance as defined in claim 1 wherein said top section and bottom section are attached by a hinge around which said top section can pivot to a first open position in which said mirror surface extends upright with respect to said bottom section.

3. An appliance as defined in claim 2 wherein said supporting means includes a pivot mounting attached to said bottom section at a point remote from said hinge.

4. An appliance as defined in claim 2, wherein said hinge is constructed to permit said top section to pivot to a second open position extending downwardly from said bottom section, and attachment means on the interior of said top section adapted to engage with a supporting surface whereby said case may be attached to such surface with said bottom section extending outwardly therefrom.

5. A kit useful to assist corrective lens wearers in applying make-up and the like with the eyeglasses removed comprising a case having a base, and a cover foldably secured at one edge of said base, means in said cover defining a mirror, means in said base foldably receiving a lens support frame, a pair of prescription lenses mounted on said frame and movable between a folded position in which said lenses are received within said base, and an erected position in which said lenses are spaced from said mirror and in general optical alignment with said mirror, the spacing between said lenses and said mirror forming a vertex distance permitting a user to observe herself through said prescription lenses in said mirror when applying make-up.

6. The kit of claim 5 in which said cover is movable to a folded-back position in generally underlying relation to said base and in substantial right-angled relation thereto, and means on said cover for temporary attachment to the surface of a vanity mirror or the like while supporting said base on said lenses in said spaced relation to said vanity mirror.

7. The kit of claim 6 in which said support means comprise suction cups mounted in said cover.

8. The kit of claim 5 in which said base and cover provide means in an open position thereof to support said kit on a table with the lenses thereof inclined upwardly at an acute angle.

9. The kit of claim 8 in which said angle is approximately 30° from the vertical.

* * * * *